(12) United States Patent
Bergman

(10) Patent No.: US 6,416,040 B1
(45) Date of Patent: Jul. 9, 2002

(54) ELECTRICIAN'S FISH TAPE REEL ASSEMBLY AND FISH TAPE WINDER-PULLER

(76) Inventor: William Bergman, 89 Woodford Rd., Deposit, NY (US) 13754

( * ) Notice: Subject to any disclaimer, the term of this patent is extended or adjusted under 35 U.S.C. 154(b) by 0 days.

(21) Appl. No.: 09/900,244

(22) Filed: Jul. 9, 2001

(51) Int. Cl.[7] .............................................. B65H 57/28
(52) U.S. Cl. ............................................ 254/134.3 FT
(58) Field of Search ................................ 254/134.3 FT, 254/134.3 R; 15/104.33; 242/395, 397.1, 397.4

(56) References Cited

U.S. PATENT DOCUMENTS

| | | | | |
|---|---|---|---|---|
| 2,736,532 A | * | 2/1956 | Hughes | .............. 254/134.3 FT |
| 3,582,044 A | * | 6/1971 | Gardner | .............. 254/134.3 FT |
| 3,763,722 A | * | 10/1973 | Ehrens | ................ 254/134.3 FT |
| 4,794,791 A | * | 1/1989 | Wittrisch | ............. 254/134.3 FT |
| 4,917,362 A | * | 4/1990 | Wilson | ............... 254/134.3 FT |
| 6,361,021 B1 | * | 3/2002 | Brennan | ................... 254/134.3 |

* cited by examiner

*Primary Examiner*—Robert C. Watson
(74) *Attorney, Agent, or Firm*—Goodman, Allen & Filetti, PLLC; Charles M. Allen, Esq.; Anthony Tacconi, Esq.

(57) ABSTRACT

This is concerned with a fish tape reel assembly in the nature of an annular tape reel formed by mating together two substantially identical hollow annular segments and including a winder-puller mechanism which is mounted between the outer lip of the two annular segments so that the fish tape contained therein may be wound and unwound by rotating the winder-puller mechanism around the periphery of the reel. The winder-puller mechanism includes a handle and a means for a grasping the fish tape so that the fish tape extended from the reel may be pulled through conduit using the grip of the handle.

11 Claims, 3 Drawing Sheets

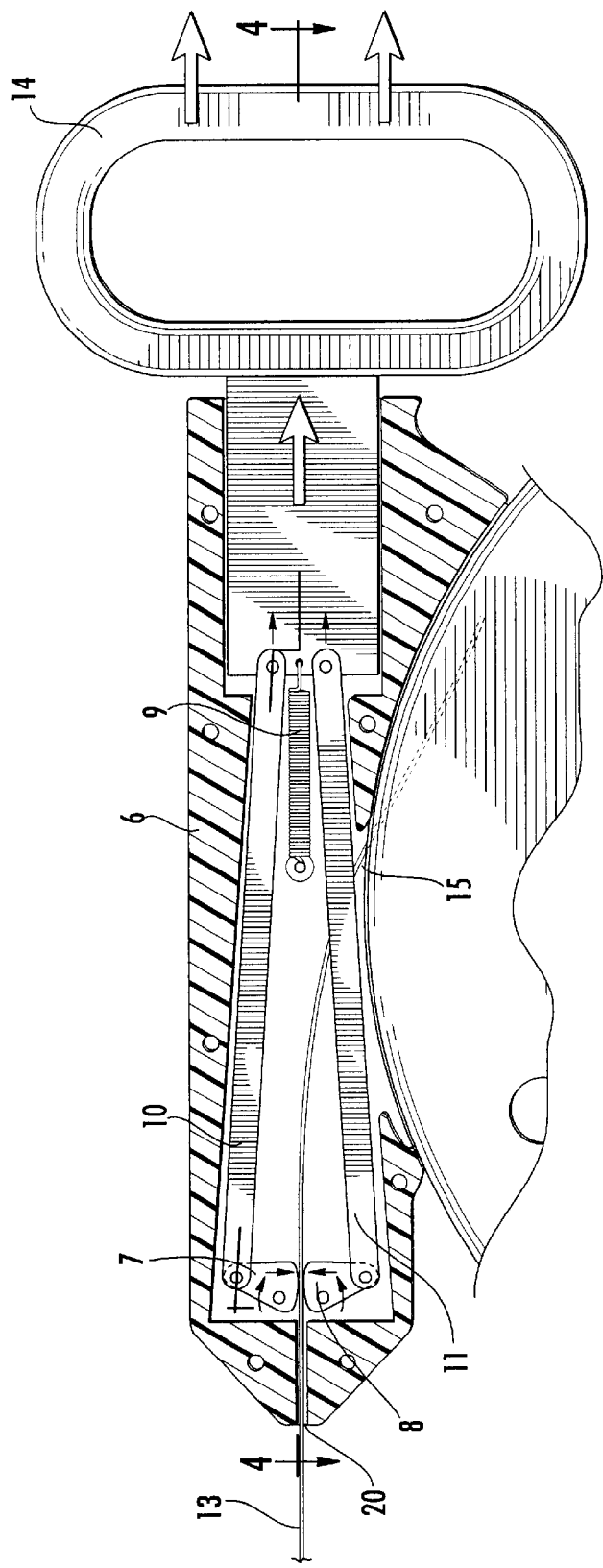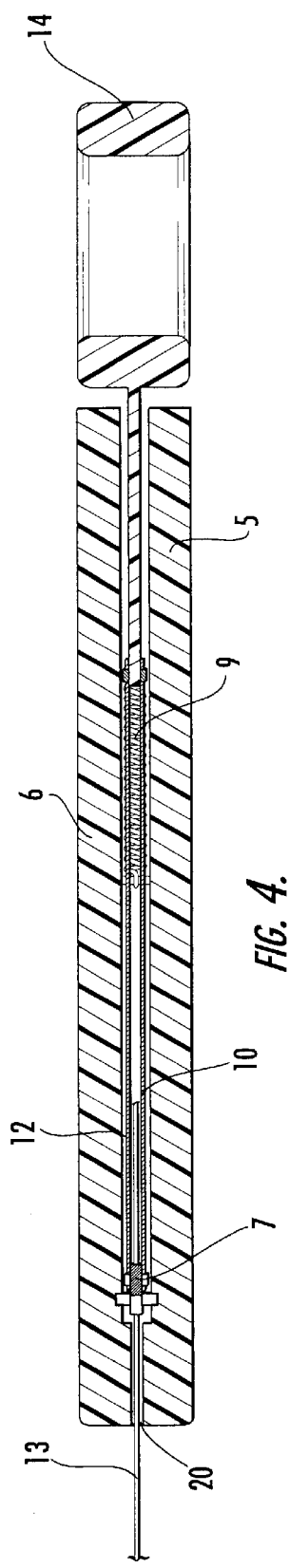
FIG. 3.
FIG. 4.

ELECTRICIAN'S FISH TAPE REEL ASSEMBLY AND FISH TAPE WINDER-PULLER

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND OF THE INVENTION

This invention relates to a fish tape reel assembly which is used to store coiled, somewhat rigid, but substantially flexible fish tape of the type used to route electrical and telephone wire through conduit. The fish tape reel assembly is in the nature of an annular tape reel formed by mating together two substantially identical hollow annular segments. A winder-puller mechanism is mounted between the outer lip of the two annular segments so that the fish tape contained in the assembly may be wound and unwound by rotating the winder-puller mechanism around the periphery of the reel. The winder-puller mechanism also includes a handle and a means for a grasping the fish tape so that the length of fish tape extended from the reel may be pulled through conduit using the handle.

Presently, fish tape is used to pull electrical, telephone, fiberoptic, or other wire through conduit. Fish tapes are made of various materials, including steel and nylon-sheated fiberglass. The tapes are generally rigid, but flexible enough so that they may be forced through conduit which often follows an irregular path. Fish tapes are customarily of substantial length, typically at least 50 feet long and often as long as 200 feet. The leading end of the tape customarily contains a fastener to which wire can be connected. Because of their length and in order to preserve their rigidity and flexibility without kinking, fish tapes are customarily coiled inside a reel for storage and transporting.

The manner in which an electrician customarily uses the fish tape in conjunction with a fish tape reel is by extending a length of fish tape by unwinding it from within a fish tape reel, then pushing the tape through conduit until the leading edge of the tape reaches the distal opening of the conduit. At the distal opening of the conduit, the leading edge of a length of wire, the remainder of which is often coiled upon a spool, is connected to the fish tape. The fish tape is then pulled through the conduit by the electrician.

The force needed to pull upon the fish tape is often substantial because of the resistance created by the weight of the length of wire being pulled, the force required to uncoil the wire from its spool, and the friction between the fish tape and the walls of the conduit, particularly where the conduit courses an irregular path. It is often difficult for the electrician, without a pulling tool, to grasp the tape and pull with sufficient force to retract the tape and the wire from the conduit.

Electricians occasionally use pliers to pull fish tape. In practice, the use of pliers for pulling fish tape is disadvantageous and inefficient because the pliers slip off the tape and because they can damage the surface of the fish tape or can kink it if the pulling force is applied in a direction other than directly opposite to the tensile resistance of the tape.

Several other types of pulling tools and devices are disclosed by the prior art which may be used by electricians. One type, exemplified by U.S. Pat. No. 5,484,135, requires that the electrician employ both hands to use the pulling tool. Another type, exemplified by U.S. Pat. No. 5,022,633, can be employed with one hand, but has the disadvantage of occasionally causing damage to the surface of the fish tape or may kink the fish tape if the force applied using the tool is not directly opposite to the tensile resistance of the fish tape.

The use of tools like those identified herein suffer the additional disadvantage that the electrician must customarily alternate use of the pulling tool with the use of the fish tape reel assembly.

Several types of fish tape reels are disclosed by the prior art. In one type of fish tape reel assembly, exemplified by U.S. Pat. No. 4,092,780, the inside surface of an outer peripheral wall of the reel is used to constrain the coiled fish tape. The wall is circumferentially split so that a slot is defined around the periphery of the reel. The halves of the wall normally meet, but are spread apart by a winder mechanism which is mounted between the halves of the outer wall. The winder can be rotated about the outer circumference of the reel in either direction so that the fish tape is coiled therein or extended therefrom. This type of fish tape reel does not provide the user with a mechanism to pull the tape through conduit and the user generally must use both hands to operate the reel. Thus, in an operation pulling wire through a conduit, the user must alternately employ a fish tape pulling tool and then employ the reel to rewind the pulled fish tape. In order to avoid excess fish tape remaining unwound, several iterations of alternate uses of the pulling tool and the reel may be required. This process is inefficient.

A second type of fish tape reel disclosed by the prior art is exemplified by U.S. Pat. No. 5,056,731. In this type of reel an inner and outer housing are mated together to form a chamber. The inner and outer housing rotate relative to one another such that rotating winds or unwinds a coiled fish tape contained therein. Like the first type of fish tape reel, this mechanism requires the user to employ both hands in order to rewind extended fish tape. Thus, in operation pulling wire through a conduit, this type of reel also requires the user to alternatively employ a fish tape pulling tool and the reel.

A combination puller and-reel is disclosed in U.S. Pat. No. 5,110,992. This combination stores a fish tape pulling tool in the hub of a reel like the type disclosed in U.S. Pat. No. 5,056,731. While such storage makes it convenient for the user to find the fish tape pulling tool, the mechanism still requires the user to alternately employ the reel and the pulling tool in an inefficient manner.

Prior art reels frequently are constructed with handles on the winder mechanism. These handles are constructed for carrying the fish tape reel, but they are not constructed so as to allow the handle to be used to pull the fish tape through the conduit. A fish tape reel of the type with a handle permitting the electrician to pull the fish tape with the handle of the reel is disclosed in U.S. Pat. No. 6,016,609. This apparatus suffers the disadvantage that pulling with the handle may result in a bending force being applied to the extended fish tape because the grip of the handle is not located so that force directly opposite to the tensile resistance of the fish tape may be conveniently applied.

SUMMARY OF THE INVENTION

It is the object of the invention to provide a fish tape reel assembly and fish tape-puller which can be used simultaneously and efficiently to retract fish tape extended into conduit and to wind the tape within the fish tape reel. It is a further object of the invention to provide a fish tape reel assembly and fish tape-puller which allows for extended fish tape to be retracted and rewound faster and easier.

It is a further object of the invention to provide a pulling mechanism with the fish tape reel assembly which has a handle with a grip constructed and located to allow for the efficient application of force in a direction opposite to the tensile resistance of the extended fish tape.

Yet another object of the invention is to provide a pulling mechanism with the fish tape reel assembly which grips the fish tape more securely as greater force is applied to pull the fish tape.

These and other objects of invention are realized by a fish tape reel assembly in which a winder-puller is mounted between the two complementary halves of the fish tape reel assembly such that rotating the winder-puller about the outer circumference of the reel spreads apart the outer lips of the halves and unwinds a length of coiled fish tape from within the reel which is extended and protruded through an aperture in the winder-puller. The winder-puller includes a handle slidably mounted in a sleeve formed by two complementary hollow sleeve segments.

In one preferred embodiment, the handle is pivotably connected to connecting rods which are pivotably connected to two cams mounted within the winder-puller. The cams are rotatably mounted opposite each other to form a channel through which the extended fish tape travels and in a fashion such that rotation of the cams narrows the channel between the cams and forces them to pinch the fish tape between their surfaces.

When pulling force is applied to the grip of the handle, the handle and the connecting rods cooperate to rotate each of the cams such that the channel between the cams is narrowed and the fish tape is pinched between the cams. Increasing the pulling force on the handle proportionally increases the pinching force upon the fish tape exerted by the cams.

According to another preferred embodiment of the invention the connecting rods are connected to a single cam rotatably mounted within the winder-puller. This single cam is mounted directly opposed to an anvil which is also mounted in the first sleeve segment such that a channel is formed between the face of the cam and the anvil through which the extended fish tape travels. Further, the cam is mounted so that rotation of the cam narrows the channel between the face of the cam and the anvil and pinches the fish tape between the anvil and the face of the cam.

In both preferred embodiments, a spring connected to the first hollow sleeve segment and to the handle biases the handle inwardly so that when no pulling force is applied to the grip, the handle is fully inserted into the sleeve and the cams are rotated such that the channel through which the fish tape passes is at its maximum width and the fish tape may be extended unimpeded through the channel.

BRIEF DESCRIPTION OF THE SEVERAL VIEWS OF THE DRAWINGS

FIG. 3 is a partial plan view of the invention with a cut-away view of the winder-puller mechanism illustrating how the handle, connecting rods and cams cooperate to effect pinching force on the fish tape when the grip of the handle is pulled.

FIG. 4 is a cross-section of the invention taken along section 4 of FIG. 4.

DETAILED DESCRIPTION OF THE INVENTION

Figure 1:
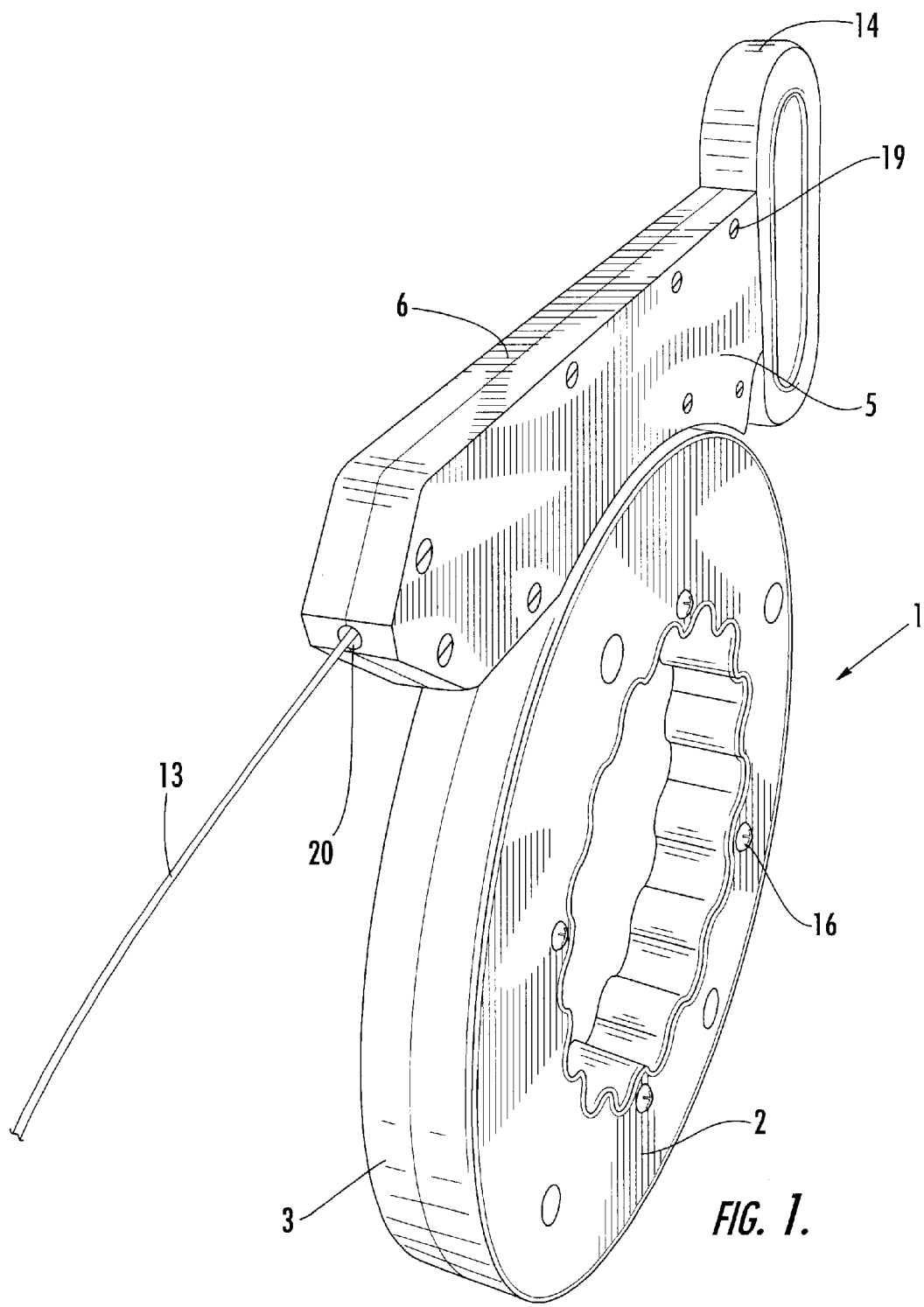
FIG. 1 is a perspective view of the of the invention showing the fish tape reel assembly with a winder-puller mechanism with a handle and a length of fish tape extending from the aperture of the winder-puller.
Figure 2:
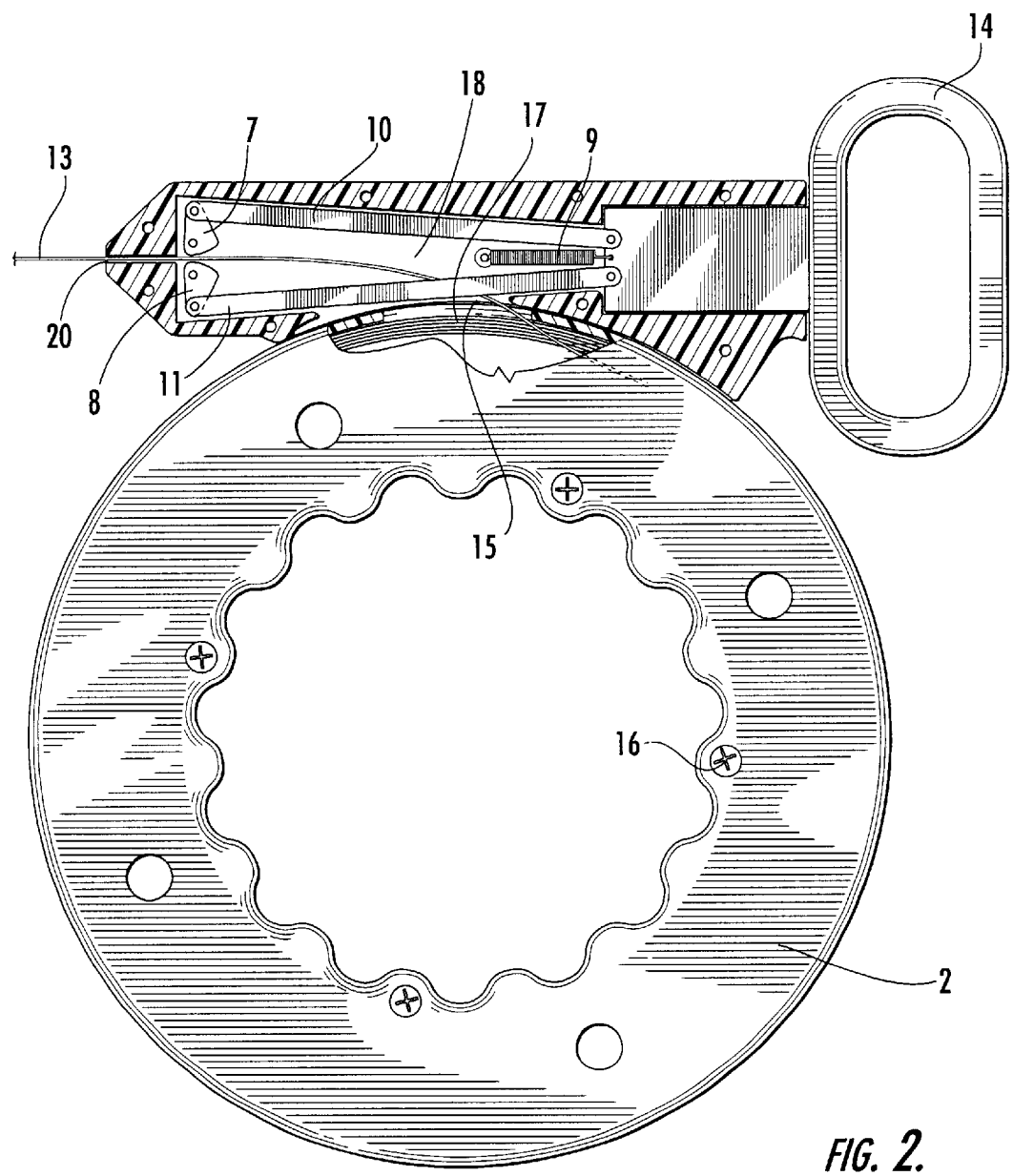
FIG. 2 is a plan view of the invention with a partial cut-away view of the winder-puller mechanism and a portion of the fish tape reel assembly.

FIG. 1 shows a fish tape reel assembly generally at 1. The assembly is made of two complementary hollow annular reel segments 2 and 3 mated together to define a hollow fish tape receiving chamber 17, as shown in FIG. 2, in which a fish tape 13 with a plurality of coils is contained. The reel segments can be made of plastic, like high-density polyethylene, although other materials could be used. The reel segments are held in relation to each other by a plurality of bolts 16, or similar fasteners, such that the inner lip of the first reel segment is directly opposed to the inner lip of the second reel segment and the outer lip of the first reel segment is directly opposed to the outer lip of the second. The reel segments are configured such that their outer lips may be flexed apart to permit the fish tape to protrude from the fish tape receiving chamber through the outwardly flexed outer lips.

Preferably, the complementary halves of the reel assembly are constructed so that the inner surface of the annular reel assembly provides a surface readily grasped by the user.

Turning to the winder-puller mechanism, as shown in FIG. 1, the mechanism is constructed of a first sleeve segment 5 and second sleeve segment 6 which are mated together to define a hollow enclosed sleeve 18, depicted in FIG. 2. The sleeve segments may be formed of plastic, like high-density polyethylene, or some other suitable material and are held in relation to one another by screws 19 or other similar fastener. One end of the sleeve formed by the sleeve segments is constructed so that a handle 14 with a connecting portion can be slidably inserted into the sleeve. The other end of the sleeve is constructed so that an aperture 20 is formed through which the extended fish tape 13 may protrude.

The first and second sleeve segments are fashioned so that when they are mated together the winder-puller mechanism may be rotatably mounted between the outwardly flexed outer lips of the annular reel assembly. The fish tape 13 protrudes from inside the reel, through the outwardly flexed lips of the reel and through a corresponding opening 15 in the winder-puller mechanism and then through the aperture 20 at the end of the winder-puller mechanism opposite the handle.

The connecting portion of the handle 14 is pivotably connected to a plurality of connecting rods. In the preferred embodiment depicted in the drawings, a first connecting rod 10 and second connecting rod 12 are pivotably connected to a first cam 7. See FIG. 4. Two connecting rods are similarly connected to the second cam 8. The cams can be constructed of steel or other material which will firmly pinch the fish tape, but will not damage the surface of the tape.

The first and second cam are rotatably mounted to the second sleeve segment 6 adjacent to the aperture 20 through which the fish tape 13 protrudes. Further, they are mounted directly opposite one another and form a channel between their opposing faces of sufficient width that the fish tape may extend through the channel unimpeded. They are also mounted such that rotation of the first and second cams narrows the channel between their opposing faces and so that the cams pinch the fish tape extending through the channel.

The grip of the handle is configured such that when a user exerts pulling force upon it, see FIG. 3, the force is applied directly opposite to the tensile resistance of the fish tape protruding through the aperture 20 of the winder-puller mechanism. This orientation of the grip minimizes the likelihood that a user will apply a bending force to the extended fish tape.

Accordingly, as shown in FIG. 3., when the grip of the handle 14 is pulled in the direction opposite to the extended fish tape 13, the handle 14 and the connecting rods 10 & 12 cooperate to rotate the first cam 7. Additional connecting rods similarly cooperate to rotate the second cam 8, such that the channel formed between the opposing faces of the first and second cams is narrowed and the cams pinch the fish tape between their opposing faces.

One end of a coiled metal spring 9 is connected to the first sleeve segment 6 and the second end is connected to the connecting portion of the handle 14 such that the handle is biased inwardly.

The fish tape reel assembly and winder mechanism is operated as follows. In order to unwind and extend the fish tape contained in the reel, the user grasps a portion of the inner surface of the annular reel assembly with one hand and the top of the winder-puller mechanism with the other. The user rotates the winder-puller mechanism about the outer circumference of the reel in the direction of the grip of the handle on the winder-puller mechanism. This action uncoils a portion of the fish tape from within the reel assembly so that it may be fed within a conduit or the like. When the user desires to pull and rewind the fish tape, the user grasps the grip of the handle of the winder-puller mechanism with one hand and pulls to retract the extended fish tape from within a conduit or the like. When a sufficient length of fish tape is retracted the user grasps a portion of the inner surface of the reel assembly with the other hand and pushes forward on the grip of the handle to rotate the winder-puller mechanism around the outer circumference of the reel assembly in the direction of the aperture of the winder-puller. This action rewinds the fish tape within the reel assembly. The user can then alternately pull on the grip, retracting the fish tape from within the conduit or the like and then push on the grip to rotate the winder-puller around the reel assembly and rewind the fish tape in a convenient and efficient way.

I claim:

1. A fish tape reel assembly and fish tape winder-puller comprising:
    a first hollow annular reel segment, said first reel segment having an outer lip and an inner lip;
    a second hollow annular reel segment, generally identical to the first hollow annular segment and having an outer lip and an inner lip, said second segment mated to the first segment to form a annular fish tape receiving chamber for receiving a length of coiled fish tape and containing a length of fish tape with a plurality of coils therein, wherein the outer lip of the first segment is opposed to the outer lip of the second segment and the inner lip of the first segment is opposed to the inner lip of the second segment; and
    a winder-puller means for unwinding the fish tape from within the fish tape receiving chamber and for winding the fish tape inwardly to the fish tape receiving chamber and for grasping and pulling a length of unwound fish tape, said winder-puller means rotatably mounted between the outer lips of the first and second reel segments and adapted to move peripherally around the reel between the outer lips, said winder-puller means having an aperture through which a length of fish tape may protrude from the fish tape receiving chamber to the exterior of the reel.

2. The fish tape reel assembly and fish tape winder-puller according to claim 1, where said winder-puller means comprises:
    a first hollow sleeve segment and a second hollow sleeve segment generally identical to the first sleeve segment, said sleeve segments fitted together to form an enclosed sleeve, said sleeve characterized by having and including a first opening at one end through which the fish tape may protrude and having and including a second opening opposite the first;
    a handle, having at one end a grip and the end opposite a connecting portion, said connecting portion constructed to be inserted into the second opening of the sleeve formed by the first and second sleeve segments, and said handle slidably mounted into the second opening of the sleeve;
    a pincher means for grasping said fish tape, said pincher means connected to the connecting portion of said handle such that such pincher means is actuated by pulling and sliding the handle outwardly from the sleeve formed by the first and second sleeve segments.

3. The fish tape reel assembly and fish tape winder-puller according to claim 2, where said pincher means comprises:
    a cam, said cam rotatably mounted to the first sleeve segment
    an anvil, said anvil mounted opposite the cam in the first sleeve segment such that a channel is formed between said anvil and said cam, said channel being of sufficient width that the fish tape may protrude through it and wherein rotating said cam pinches the fish tape between the anvil and the cam;
    at least one connecting rod, each rod having a first and second end, said first end of each rod pivotably connected to the connecting portion of said handle and the second end of each rod pivotably connected to said cam, wherein pulling said grip of the handle outwardly from the sleeve formed by the first and second sleeve segments rotates the cam to pinch the fish tape between the anvil and the cam.

4. The fish tape reel assembly and fish tape winder-puller according to claim 3, further comprising a spring mechanism having two ends, the first end of said spring mechanism connected to the connecting portion of said handle and the second end of said spring mechanism connected to said first sleeve segment, wherein said spring mechanism biases the handle inwardly to the sleeve formed by the first and second sleeve segments.

5. The fish tape reel assembly and fish tape winder-puller according to claim 2, where said pincher means comprises:
    a first cam, said cam rotatably mounted to the first sleeve segment
    a second cam, said second cam rotatably mounted opposite said first cam in the first sleeve segment, such that a channel is formed between the first and second cams, said channel being of sufficient width that the fish tape may protrude through it and wherein rotating said cams pinches the fish tape between the first and second cams;
    at least two connecting rods, each rod having a first and second end, said first end of each rod pivotably connected to the connecting portion of the handle, the second end of at least one connecting rod pivotably connected to the first cam and the second end of at least one connecting rod pivotably connected to the second cam, wherein pulling said grip of the handle outwardly from said sleeve formed by the first and second sleeve segments rotates the first and second cams to pinch the fish tape between the first and second cams.

6. The fish tape reel assembly and fish tape winder-puller according to claim 5, further comprising a spring mechanism having two ends, the first end of said spring mechanism connected to the connecting portion of said handle and the second end of said spring mechanism connected to said first sleeve segment, wherein said spring mechanism biases the handle inwardly to the sleeve formed by the first and second sleeve segments.

7. The fish tape reel assembly and fish tape winder-puller according to claim 2, wherein the grip of said handle is constructed so that the long axis of said grip lies in a plane which is substantially parallel to the plane formed by the intersection of the outer lip of the first annular reel segment and the outer lip of the second annular reel segment, and the long axis of said grip is substantially perpendicular to the direction in which the fish tape protrudes from the aperture of the winder-puller.

8. The fish tape reel assembly and fish tape winder-puller according to claim 3, wherein the grip of said handle is constructed so that the long axis of said grip lies in a plane which is substantially parallel to the plane formed by the intersection of the outer lip of the first annular reel segment and the outer lip of the second annular reel segment, and the long axis of said grip is substantially perpendicular to the direction in which the fish tape protrudes from the aperture of the winder-puller.

9. The fish tape reel assembly and fish tape winder-puller according to claim 4, wherein the grip of said handle is constructed so that the long axis of said grip lies in a plane which is substantially parallel to the plane formed by the intersection of the outer lip of the first annular reel segment and the outer lip of the second annular reel segment, and the long axis of said grip is substantially perpendicular to the direction in which the fish tape protrudes from the aperture of the winder-puller.

10. The fish tape reel assembly and fish tape winder-puller according to claim 5, wherein the grip of said handle is constructed so that the long axis of said grip lies in a plane which is substantially parallel to the plane formed by the intersection of the outer lip of the first annular reel segment and the outer lip of the second annular reel segment, and the long axis of said grip is substantially perpendicular to the direction in which the fish tape protrudes from the aperture of the winder-puller.

11. The fish tape reel assembly and fish tape winder-puller according to claim 6, wherein the grip of said handle is constructed so that the long axis of said grip lies in a plane which is substantially parallel to the plane formed by the intersection of the outer lip of the first annular reel segment and the outer lip of the second annular reel segment, and the long axis of said grip is substantially perpendicular to the direction in which the fish tape protrudes from the aperture of the winder-puller.

* * * * *